F. HARDINGE.
CONTROLLING MECHANISM FOR LATHE STRUCTURES OR THE LIKE.
APPLICATION FILED APR. 6, 1908.

928,045.

Patented July 13, 1909.

3 SHEETS—SHEET 1.

Witnesses
George C. Higham.
Leonard W. Novander

Inventor
Franklin Hardinge
By Brown & Williams
Attorneys

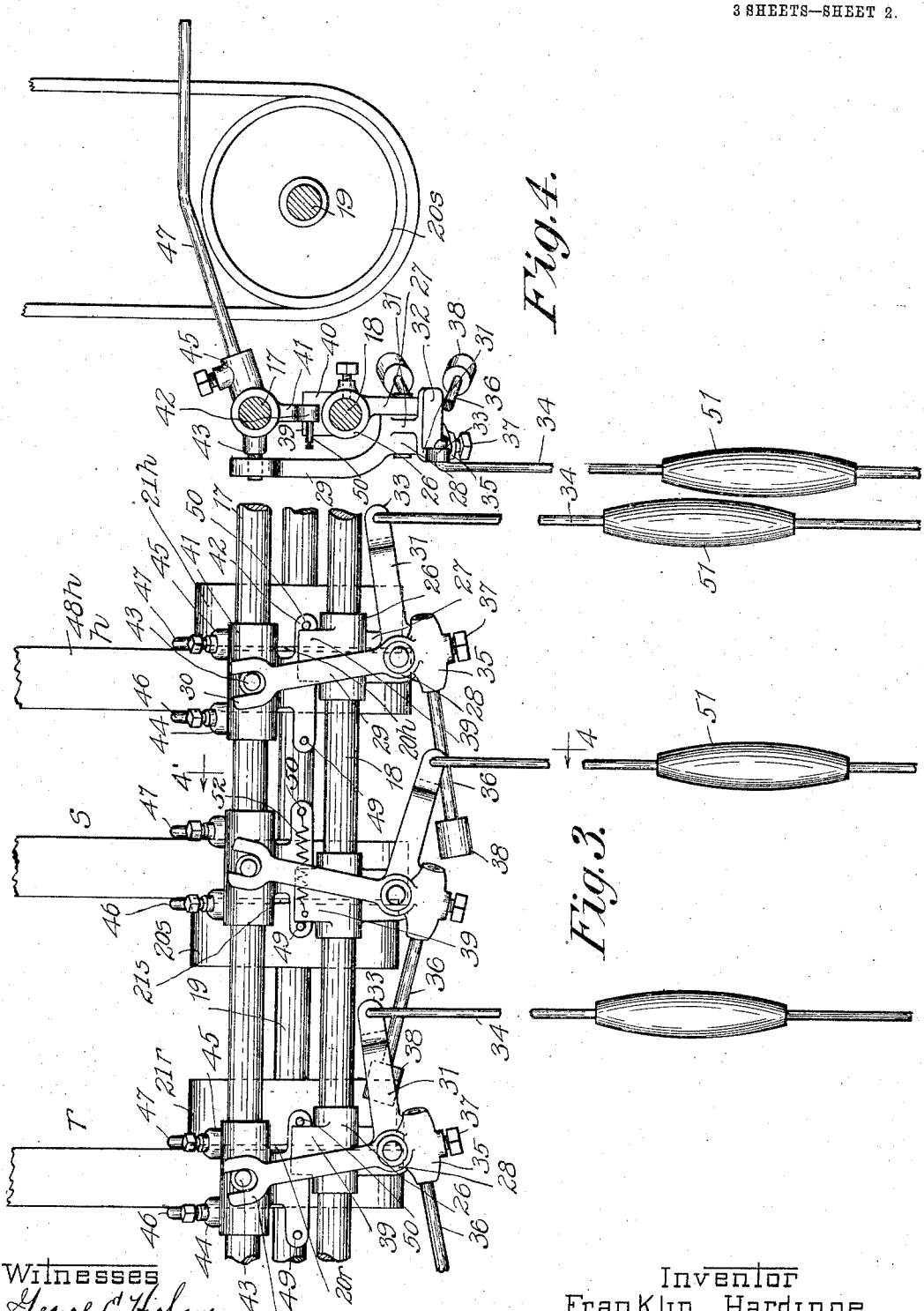

F. HARDINGE.
CONTROLLING MECHANISM FOR LATHE STRUCTURES OR THE LIKE.
APPLICATION FILED APR. 6, 1908.
928,045.
Patented July 13, 1909.
3 SHEETS—SHEET 3.
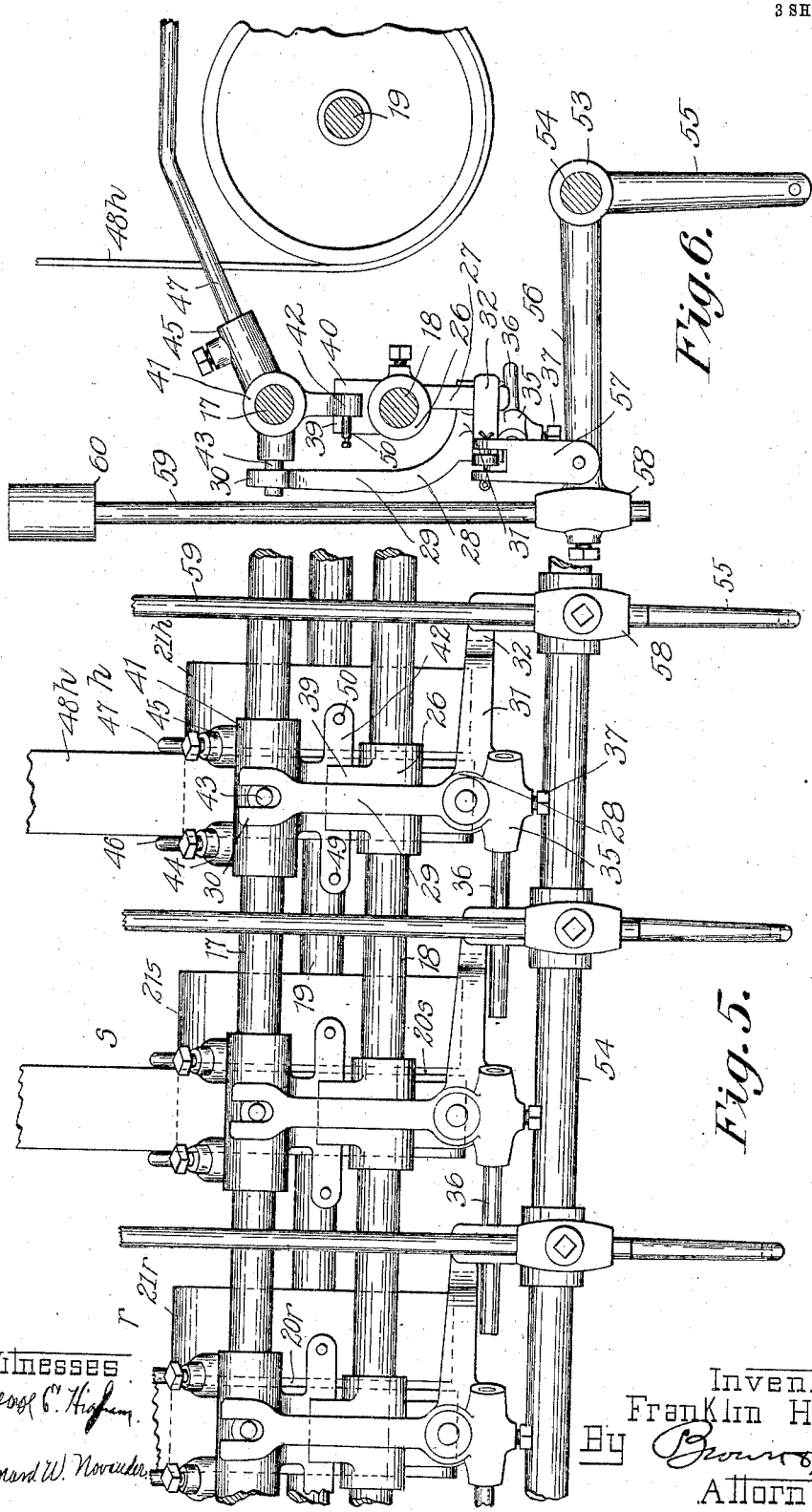
Witnesses
Inventor
Franklin Hardinge
By
Attorneys

UNITED STATES PATENT OFFICE.

FRANKLIN HARDINGE, OF CHICAGO, ILLINOIS.

CONTROLLING MECHANISM FOR LATHE STRUCTURES OR THE LIKE.

No. 928,045.  Specification of Letters Patent.  Patented July 13, 1909.

Application filed April 6, 1908. Serial No. 425,364.

*To all whom it may concern:*

Be it known that I, FRANKLIN HARDINGE, a citizen of the United States, residing at Chicago, in the county of Cook and State of Illinois, have invented a certain new and useful Improvement in Controlling Mechanism for Lathe Structures or the Like, of which the following is a full, clear, concise, and exact description, reference being had to the accompanying drawings, forming a part of this specification.

My invention relates to controlling mechanism for bench lathes or the like, concerning particularly improved driving and speed control therefor.

In conjunction with my invention I provide unitary supporting mechanism for the lathe or like machine, the driving shafting, counter-shafting, and all other parts instrumental in supporting, driving and controlling the machines.

In lathe controlling mechanism there are usually several speeds and directions of driving provided for and a plurality of levers for controlling the connection for service of the various speed and reversing members. It has been necessary heretofore where one controlling lever has been actuated to manually restore this lever before another lever can be actuated, this necessitating a great many movements during the operation of the machine, and resulting, consequently, in loss of time.

One of the main features of my invention, therefore, resides in interlocking mechanism whose purpose is to automatically disconnect one driving mechanism from service while another driving mechanism is being connected for service. The application of my invention is such that when one lever is moved to connect in its driving mechanism, the adjacent lever mechanism which has been in service will be automatically restored to disconnect its driving mechanism, thus automatically preventing connection in of two adjacent driving mechanisms at the same time, with the least amount of work and time. The unitary supporting structure is particularly adaptable for supporting the shafting, and counter-shafting necessary for this automatic controlling mechanism.

Figure 1:
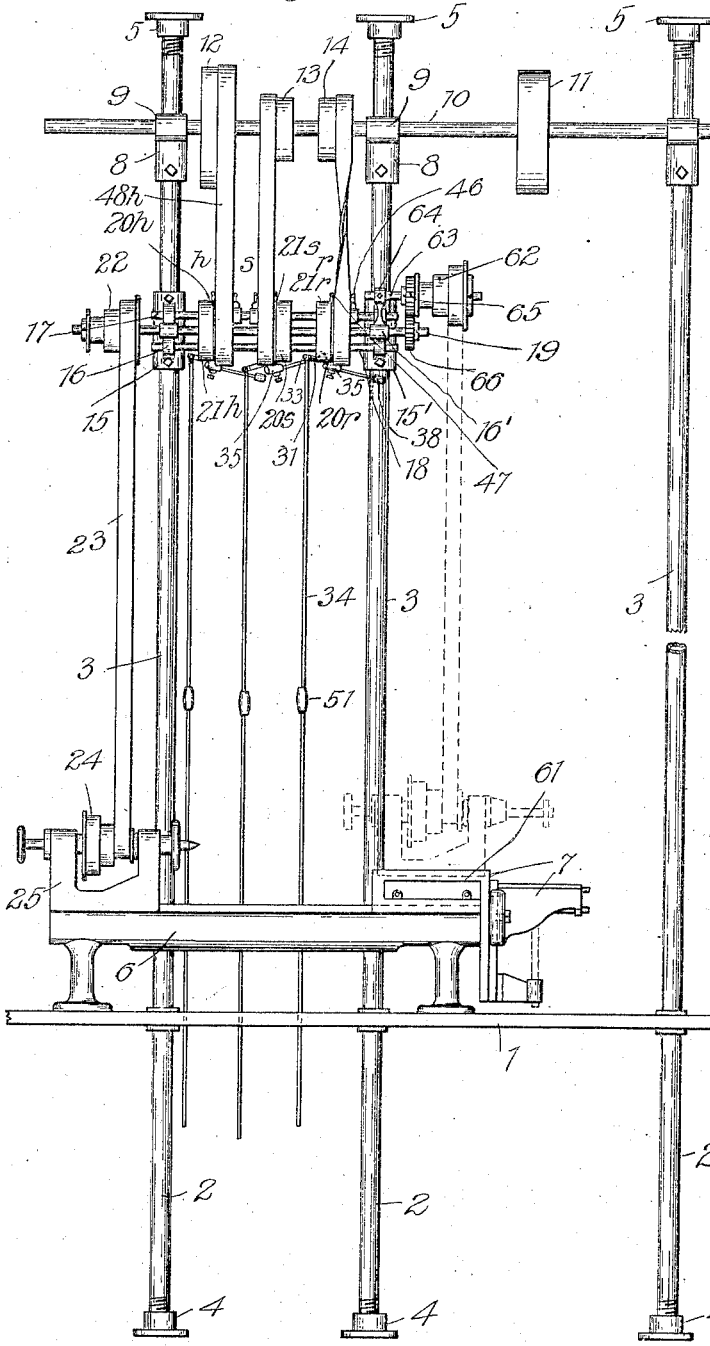
Figure 2:
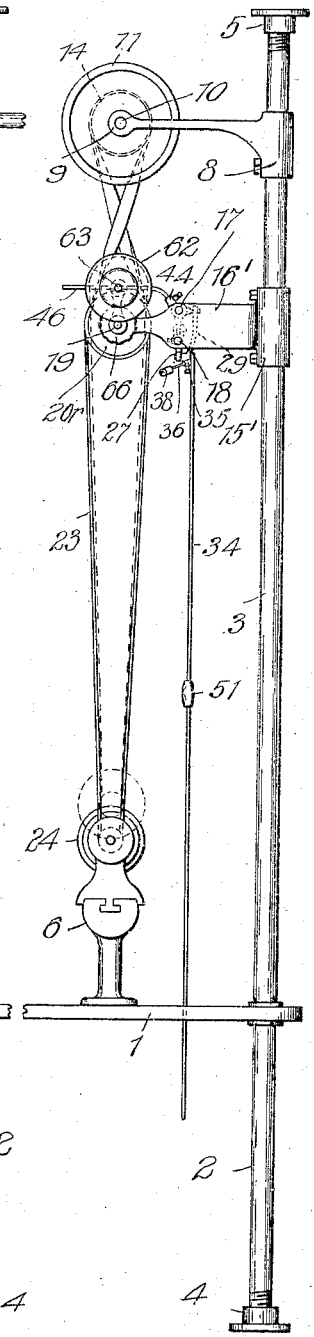

In the accompanying drawings which illustrate the various features of my invention, Figure 1 is a front view of a supporting structure with a lathe and its various drive and speed control mechanisms in place thereon, Fig. 2 is a side view of the mechanism shown in Fig. 1, Fig. 3 is an enlarged rear view of the automatic connecting and speed controlling mechanism, Fig. 4 is a sectional view taken from plane 4—4 of Fig. 3, Fig. 5 is an enlarged top view of a modified arrangement of automatic controlling mechanism, and Fig. 6 is an end view of the mechanism in Fig. 5.

The supporting structure comprises the bench or table plate 1 supported on legs 2 of any desired number and suitably braced. Extending from the bench are the vertical uprights 3, usually two for each bench section. These uprights 3 and the legs 2 are preferably in the form of pipe of suitable strength, and each upright may be a continuation of one of the legs 2. The ends of the legs 2 are threaded and provided with adjustable shoes 4, while the upper ends of the uprights are also threaded and provided with adjustable caps 5. The combined length of the legs and uprights is such that the feet and caps can be adjusted to engage the floor and ceiling respectively, these feet and caps being flanged whereby they may be bolted or otherwise secured to thus rigidly hold the supporting frame in place. The supporting structure can, therefore, be very readily set up and secured in any part of a room, and is entirely independent of the wall.

On the bench I have shown a lathe structure 6 such as described in my copending application, Serial No. 352,461, filed January 15, 1907, which is provided with a milling attachment 7 at one end, as described in said copending application. Near the top of the uprights 3 are the sleeves 8, each supporting a bearing 9, in which bearing is journaled the drive shaft 10 carrying a drive pulley 11, and also carrying the high and low speed pulleys 12 and 13, and the reverse pulley 14. These pulleys 12, 13 and 14 are mounted together between two of the uprights 3, which are suitably spaced to the rear of the lathe or other machine which is to be driven. Below these pulleys and secured to the uprights are the sleeves 15 and 15' for supporting the automatic controlling mechanism for the lathe.

Referring particularly to Figs. 3 and 4, arms 16 and 16' extend forwardly from the sleeves 15 and 15' respectively and form bearings for free shafts 17, 18, and 19. Shaft 19 is journaled at the ends of the arms 16 and 16', while shafts 17 and 18 are parallel and lie in a vertical plane between the shaft 19 and the sleeve, as best shown in Fig. 2. On shaft 19 are mounted three pulley sets coöperating with pulleys 12, 13 and 14 respectively. The first pulley set comprises the idler pulley $20^h$ mounted loosely on shaft 19, and the drive pulley $21^h$ keyed to said shaft; the second set comprises idler pulley $20^s$ and drive pulley $21^s$; and the third set comprises an idler pulley $20^r$ and drive pulley $21^r$. At the left end of shaft 19, as shown in Fig. 1 is secured a cone pulley 22 shown as connected by means of belt 23 with the cone pulley 24 of the headstock 25 of the lathe itself. Pulleys 12 and 13 are connected through straight belts with the drive sets $h$ and $s$ to cause respectively high and low speeds of the shaft 19, while pulley 14 is connected through a crossed belt with the set $r$ to cause reverse rotation of the shaft 19.

The mechanism for controlling the service connection of the various driving sets is mounted on shafts 17 and 18. The controlling mechanisms for each set are alike. Each comprises a supporting sleeve 26 suitably secured to the shaft 18. Each sleeve has a pivot lug 27 extending downwardly to whose lower end is pivoted a bell crank lever 28. The vertical arm 29 of the bell crank lever has a bifurcated end 30, and the horizontal arm 31 extends to the right and has the transverse end piece 32, from whose one end projects the pivot extension 33, to which is pivoted the upper end of the shift rod 34. Also secured to the hub of the bell crank lever, preferably cast integral therewith, is a sleeve 35, in which is secured one end of a weight rod 36 as by means of a set screw 37, the weight rod extending to the left of the lever and terminating in a weight 38. Extending parallel and upwardly from the sleeve 26 are the two guide walls 39 and 40. Over each sleeve 26 and slidably mounted on shaft 17 is a sleeve 41, from which extends downwardly the guiding web 42 which engages between the guide walls 39 and 40 extending from sleeve 26. Extending horizontally from the sleeve 41 and at right angles to the shaft 17 is a guide post 43 engaging the bifurcated end 30 of the bell crank lever 28, and, therefore, upon rotation of this bell crank lever the sleeve 41 will be slid along shaft 17. Extending rearwardly from the sleeve 41 are two lugs 44 and 45 in which are secured the ends of belt shifting rods 46 and 47, between which is guided the belt 48 for driving the corresponding controlling mechanism. Passing through the ends of guide web 42 are pins 49 and 50 respectively, which, by engaging with the ends of guide walls 39 and 40, limit the longitudinal movement of the guide web and the sleeve 41, and consequently limit the rotation of the bell crank lever. The adjustment is such that when the clutch rods 34 are up, the belts 48 will be in engagement with the idler pulleys of the sets, and when a clutch rod is moved downwardly, the associated belt is moved into engagement with the driving pulley of the set. The weight 38 and the length of arm 36 is adjusted to be such that the weight of the clutch rod is balanced so that the belt and controlling mechanism will remain in the position to which they have been moved. Each clutch rod may be provided with a suitable grip 51, and the clutch rods may pass downwardly through guide holes in table 1, and being directly to the rear of the lathe or other machine, can be readily manipulated. The weight rods 36 also act as interlocking rods and extend into the path of the cross-pieces 32 at the ends of the arms 31 of the adjacent bell crank levers. Thus the weight arm of the high speed controlling mechanism extends into the path of the cross-piece 32 of the slow speed controlling mechanism and the weight arm of the slow speed controlling mechanism extends into the path of the cross-piece of the reverse controlling mechanism. The operation is such that when one mechanism has been actuated to connect its driving pulley for service, and another mechanism is actuated to connect its driving pulley, the first mechanism is automatically restored to the idle position so that two mechanisms cannot be connected in service at the same time.

Normally when the lathe is idle, the clutch rods are in their upper positions and the belts are all in engagement with the idler pulleys. Suppose it is desired to start the lathe forwardly at slow speed, the middle rod is pulled down and the controlling mechanism parts are shifted to carry the belt from the idler to the driving pulley to cause transmission of power from driving shaft 10 to counter shaft 19, and through the belt to the lathe. The cross-piece 32 of the slow speed bell crank lever comes into engagement with the weight arm of the high speed mechanism and the weight arm of the slow speed mechanism comes into engagement with the cross-piece of the reverse mechanism. The high speed and reverse mechanisms are now locked against operation. If it is now desired to shift to the high speed, it will be unnecessary to first raise the shift rod of the slow speed mechanism, but the high speed clutch rod can be directly pulled downwardly. As the high speed lever and connected mechanism is moved to carry the belt to the high speed driving pulley, the weight arm 36 is raised, and being in engagement with the cross-piece of the slow speed bell crank lever, this lever is rotated to cause its connected mechanism to carry the slow speed belt back to the idler pulley. If it is desired to return to slow speed, all that is necessary is to pull down the slow speed clutch lever, and as the slow speed mechanism is moved to carry the belt to the drive pulley, the cross-piece of this mechanism engages the weight arm of the high speed mechanism and restores this mechanism to carry its belt back to the idler pulley. If now reverse rotation is desired, the reverse clutch rod is pulled down and while the reverse belt is being carried to the drive pulley, the cross-piece 32 of the reverse mechanism is engaging with the weight arm of the slow speed mechanism which is restored to carry its belt to the idle pulley. In the same way to again return to slow speed, for instance, the slow speed clutch rod is pulled down and the slow speed drive pulley is connected for service, while the reverse belt is restored to the idler pulley. The interlocking cycle is broken between the reverse and the high speed mechanisms. This does not matter so very much, however, as the combinations most frequently used are slow and high speeds or slow and reverse speeds, the reverse and high speed combination being comparatively very infrequently used. The interlocking connection for the slow and high speed mechanisms is always effective and likewise the interlocking arrangement for the reverse and slow speeds is always effective. It is very seldom that a workman would want to shift from reverse directly to high speed or from high speed directly to reverse, the slow speed being usually included, and, therefore, for the ordinary operation of the lathe, the interlocking feature can be said to be always active. This locking feature saves a great deal of work and time during the operation of a lathe or other machine in that it is unnecessary when shifting from one position to the other to first manually cause restoration of one position before the other position is manually connected in. In my arrangement one movement is sufficient to accomplish a change from one position to another. Furthermore it is impossible with my arrangement to connect in one mechanism without automatically disconnecting the adjacent mechanism which has been in service. Where this interlocking feature is not provided, it is possible, and very often occurs, that through carelessness two speeds or two directions of operation will be connected in at the same time.

The clutch mechanisms may also be operated by foot power, and this may be accomplished by extending the clutch rods down to the floor and connecting them with pedals. Where foot power is used it is desirable that pressure on a pedal will cause shifting of the control belt to the driving pulley and release of the pedal will automatically result in restoration of the belt to the idler. This can be accomplished by inserting a tension spring between the sliding sleeves 41 and some stationary part of the frame. As shown in Fig. 3, the right stop pin 50 may be lengthened at one side to form a support for one end of the spring 52, whose other end can be conveniently secured to one of the guide walls 39 or 40. The spring could also be inserted between the left stop pins 49 and the stationary frame of the adjacent mechanism to the left. With this arrangement when a pedal is depressed the belt shifting mechanism is moved against the tension of spring 52 and when the pedal is released the spring returns the shift mechanism to carry the belt back to the idler pulley. The interlocking arrangement, however, remains effective. The balancing weights 38 become unnecessary where the springs 52 are used, and can be omitted.

In Figs. 5 and 6 the modified arrangement of the clutch mechanisms is particularly adaptable where these mechanisms are secured to the ceiling, as is sometimes desirable. The general arrangement is the same as that shown in Figs. 1, 2, 3, and 4, except that the sleeves 15, 15' are replaced by flanges, which can be bolted to the ceiling. Additional lever mechanism is also interposed between the clutch rods and the bell crank mechanism, the bell crank levers lying in a horizontal plane instead of in vertical planes as shown in Figs. 1, 2, 3, and 4. An additional bell crank lever 53 is used for each mechanism, these levers being pivoted on the shaft 54 supported in bearings, not shown, which bearings may be supported from an extension of the arms 16 and 16', the horizontal arms 55 of these bell crank levers connecting with the clutch rods. Near the end of the vertical arm 56 of the bell crank lever 53 is pivoted one end of the link 57, whose other end is pivoted to the pivot extension 33 at the end of arm 31 of the corresponding bell crank lever 28. At the upper end of the vertical arm 56 is a sleeve 58 in which is secured a weight rod 59 terminating in a weight 60, this weight rod and arm being adjusted to counterbalance the weight of the clutch rod. When a clutch rod is pulled down, the bell crank 53 is rotated to carry its arm 56 forwardly and to cause rotation of the connected bell crank 28 of the controlling mechanism, which causes shifting of its belt from the idle pulley to the driving pulley. If the adjacent mechanism had been in driving position, the interlocking arm 36 of the mechanism just actuated would become effective to restore the previously actuated mechanism to its idle position in the same manner as described with reference to Figs. 1 to 4. Pedal control could also be used for the clutch rods of this arrangement, and in that case the weights 60 could be omitted and springs 52 applied.

Various other modifications can also be made to adapt the driving mechanism and interlocking feature to various operation conditions and circumstances besides those explained.

The arrangement shown in Fig. 1 is particularly adapted to a combination lathe and milling machine structure as described in my copending application referred to. The milling mechanism is supported from a block 61 which is adapted for engagement with the right end of the lathe bed. When the milling attachment is to be used the headstock 25 is moved to the top of this block 61, and to make it possible to use the same belt 23 for driving the head stock in this raised position, a second driving cone pulley 62 is provided to be driven from the right end of shaft 19. This cone pulley is pivoted on a stub shaft 63 which is removably secured in the lug 64 which may extend from the arm 16'. Secured to this cone pulley is a gear 65 which meshes with a gear 66 keyed to the right end of shaft 19. With this arrangement when the milling attachment is to be used, the headstock and belt are merely shifted to the right end of the lathe and the belt connected with cone pulley 62, which is driven from shaft 19 through gears 66, 65.

I thus provide a unitary structure comprising the supporting frame, working machine to be driven, and the various driving shafting and counter-shafting, together with an interlocking mechanism, this unitary structure being adapted to be placed in any position. The structure is also very simple and compact, and can be readily taken apart for shipment.

I desire to secure the following claims by United States Letters Patent:

1. In an apparatus of the class described, the combination of a machine to be driven, a main drive shaft, a plurality of driving pulleys on said shaft, a counter-shaft connected with the machine to be driven, a plurality of drive pulleys secured to the counter-shaft, an idler pulley associated with each drive pulley, a belt for connecting each set of counter-shaft pulleys with a pulley on the main shaft, belt shift mechanism for each set of pulleys adapted to be actuated to shift the belt from the idler pulley to the drive pulley or vice versa, and interlocking lever mechanisms connected with the shift mechanisms and adapted upon movement of one shift mechanism to move its belt in one direction to automatically cause shifting of another belt in the opposite direction.

2. In an apparatus of the class described, the combination of a machine to be driven, a main drive shaft, a plurality of driving pulleys on said shaft, a counter-shaft connected with the machine to be driven, a plurality of drive pulleys secured to the counter-shaft, an idler pulley associated with each drive pulley, a belt for connecting each set of counter shaft pulleys with a pulley on the main shaft, belt shifting mechanism for each set of pulleys adapted to be actuated to shift the belt from the idler pulley to the drive pulley or vice versa, and lever mechanism connected with each shift mechanism, said lever mechanism being interlocked and adapted when one shift mechanism is actuated to shift its belt from the idle to the driving position to automatically cause movement of another shift mechanism to move the belt from the drive pulley to the idler pulley.

3. In an apparatus of the class described, the combination of a machine to be driven, a main drive shaft, a plurality of driving pulleys on said shaft, a counter-shaft connected with the machine to be driven, a plurality of drive pulleys secured to the counter-shaft, an idler pulley associated with each drive pulley, a belt for connecting each set of counter-shaft pulleys with the pulley on the main shaft, belt shift mechanism for each set of pulleys adapted to be actuated to shift the belt from the idler pulley to the drive pulley or vice versa, and interlocking lever mechanisms connected with the shift mechanisms and adapted when one shift mechanism is moved to connect its belt from the idle pulley to the drive pulley to lock other shift mechanisms against transferring their belts from the idle to the drive pulleys.

4. In an apparatus of the class described, the combination of a machine to be driven, a main driving shaft, a plurality of drive pulleys on said shaft, a counter-shaft connected with the machine to be driven, a plurality of intermediate drive pulleys connected with the counter-shaft, an idler pulley associated with each intermediate pulley, a belt for each set of counter-shaft pulleys for connecting said pulleys with one of the main shaft driving pulleys, a belt shifter for each belt, a lever associated with each belt shifter and adapted when swung in one direction to connect the associated belt with the idler pulley and when swung in the opposite direction to shift the belt to the drive pulley, locking arms extending from each lever, the locking arms of each lever extending into the path of the interlocking arms of the adjacent levers, whereby when one lever is swung to one position to shift its belt, the adjacent levers will be locked in or moved to the other position.

5. In an apparatus of the class described, the combination of a machine to be driven, a main driving shaft, a plurality of driving pulleys on said shaft, a counter-shaft connected with the machine to be driven, an idle pulley and a drive pulley on the counter-shaft associated with each of the drive shaft pulleys, a belt for connecting each set of counter-shaft pulleys with its drive shaft pulley, a belt shifter for each belt, a lever for actuating each belt shifter to connect its belt either with the associated drive pulley or the idle pulley, an arm extending to the left of each lever, an arm extending to the right of each lever, the arms of one lever lying in the path of the arms of the adjacent levers so that when one lever is rotated in one direction, the arms will coöperate to cause rotation of the adjacent levers in the opposite direction, whereby only one of adjacent driving pulleys can be connected for service at one time.

6. In an apparatus of the class described, the combination of a machine to be driven, a main driving shaft, a driving pulley on said shaft, a countershaft connected with the machine to be driven, a drive pulley and an idler pulley on the counter-shaft, a belt for connecting the counter-shaft pulleys to the main drive pulley, two rods supported parallel to the counter-shaft, a pivot member supported on one rod, a slidable member on the other rod, belt shifting arms extending from the slidable member and engaging the belt so that sliding of the slidable member will shift the belt from one counter-shaft pulley to the other, a lever pivoted to the stationary pivot member and engaging with the slidable member, and an actuating rod engaging with the lever.

7. In an apparatus of the class described, the combination of a machine to be driven, a main drive pulley, a counter-shaft connected with the machine to be driven, a drive pulley and an idler pulley on the counter-shaft, a belt for connecting the main drive pulley with the counter-shaft pulleys, two shafts supported parallel to the counter-shaft, a pivot member secured to one of said shafts, a shift member slidable longitudinally on the other shaft, shift arms extending from the shift member and engaging the belt, whereby sliding of the shift member on its shaft will cause shifting of the belt from one counter-shaft pulley to the other, a lever pivoted to the pivot member and engaging the shift member, and actuating mechanism connected with the lever, said pivot member having a guiding slot, and said shaft member having a guide extension engaging in said guiding slot.

8. In an apparatus of the class described, the combination of a machine to be driven, a main drive pulley, a counter-shaft connected with the machine to be driven, a drive pulley and an idler pulley on the counter-shaft, a belt for connecting the main drive pulley with the counter-shaft pulleys, two shafts supported parallel to the counter-shaft, a pivot member secured to one of said shafts, a shift member slidable longitudinally on the other shaft, shift arms extending from the shift member and engaging the belt, whereby sliding of the shift member on its shaft will cause shifting of the belt from one counter shaft pulley to the other, a lever pivoted to the pivot member and engaging the shift member, actuating mechanism connected with the lever, said pivot member having a guiding slot, and said shift member having a guide extension engaging in said guiding slot, and stops on the guide member coöperating with the stationary pivot member to limit the movements of the shift member.

9. In an apparatus of the class described, the combination of a machine to be driven, a main driving pulley, a counter-shaft connected with the machine to be driven, a driving pulley and an idler pulley on the counter-shaft, a belt for connecting the counter-shaft pulleys with the main drive pulley, two rods supported parallel to the counter-shaft, a shift member slidable on one rod and connected with the belt to shift said belt from one counter-shaft pulley to the other, a bell crank lever pivoted at its elbow to the other rod, one arm of the bell crank lever connected with the shift member, an actuating member connected with the other arm of the bell crank lever, movement of the actuating member causing rotation of the bell crank lever to cause the shift member to be slid on its rod, and a weighted lever extending from the bell crank lever for counter-balancing the weight of the actuating member.

10. In an apparatus of the class described, the combination of a machine to be driven, a plurality of main driving pulleys, a counter-shaft connected with the machine to be driven, sets of counter-shaft pulleys, each set comprising a driving pulley and an idler pulley, a belt for each set of counter-shaft pulleys for connecting said pulleys with one of the main driving pulleys, a rod extending parallel to the counter-shaft, a shift member for each set of counter-shaft pulleys associated with the belt for said pulleys, said shift members being longitudinally slidable on said rod, a lever for each shift member connected at one end with the shift member and stationarily pivoted at its other end, an actuating arm extending in one direction from each lever, an interlocking arm extending in the opposite direction from each lever, the actuating arm of one lever and the interlocking arm of the adjacent lever lying in each other's paths, rotation of one lever causing movement of the shift member to shift its belt from one pulley to the other, the actuating and interlocking arms of the moved lever engaging with the arms of the adjacent levers to move said levers or to retain said levers in a position opposite to that assumed by the moved arm.

11. In an apparatus of the class described, the combination of a machine to be driven, a plurality of main driving pulleys, a counter-shaft connected with the machine to be driven, sets of counter-shaft pulleys, each comprising a driving pulley and an idler pulley, a belt for each set of counter-shaft pulleys for connecting said pulleys with one of the main driving pulleys, a rod extending parallel to the counter-shaft, a shift member for each set of counter-shaft pulleys associated with the belt for said pulleys, said shift members being longitudinally slidable on said rod, a lever for each shift member connected at one end with the shift member and stationarily pivoted at its other end, an actuating arm extending in one direction from each lever, an interlocking arm extending in the opposite direction from each lever, the actuating arm of one lever and the interlocking arm of the adjacent lever lying in each other's paths, rotation of one lever causing movement of the shift member to shift its belt from one pulley to the other, the actuating and the interlocking arms of the moved lever engaging with the arms of the adjacent levers to move said levers to or to retain said levers in the position opposite to that assumed by the moved arm, the interlocking arms of each lever being weighted to counterbalance the actuating arm of said lever, whereby the lever will be retained in the position to which it has been moved.

In witness whereof, I hereunto subscribe my name this 2nd day of April, A. D. 1908.

FRANKLIN HARDINGE.

Witnesses:
 CHARLES J. SCHMIDT,
 GEORGE E. HIGHAM.